(12) United States Patent
Hattori et al.

(10) Patent No.: US 6,494,227 B2
(45) Date of Patent: Dec. 17, 2002

(54) VALVE

(75) Inventors: Toshio Hattori, Yokohama (JP); Taiki Aoyama, Yokohama (JP)

(73) Assignees: Nifco Inc., Yokohama (JP); Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/932,874

(22) Filed: Aug. 21, 2001

(65) Prior Publication Data

US 2002/0046770 A1 Apr. 25, 2002

(30) Foreign Application Priority Data

Aug. 29, 2000 (JP) .......................................... 2000-259522
Dec. 13, 2000 (JP) .......................................... 2000-378626

(51) Int. Cl.[7] .............................................. F16K 24/04
(52) U.S. Cl. ........................................ 137/43; 137/202
(58) Field of Search ................................... 137/43, 202

(56) References Cited

U.S. PATENT DOCUMENTS 4,104,004 A * 8/1978 Graef ........................... 137/202
5,413,137 A * 5/1995 Gimby ........................... 137/43

* cited by examiner

*Primary Examiner*—Gerald A. Michalsky
(74) *Attorney, Agent, or Firm*—Oblon, Spivak, McClelland, Maier & Neustadt, P.C.

(57) ABSTRACT

A valve for preventing fuel leaking from a fuel tank includes a housing that has a passage that communicates with the outside. In the housing there is a float that is used to open and close the passage by being moved axially along the housing. The valve is provided with a device to guide the float to close the passage. The device includes a gap formed between the housing and the float that increases in size with increasing distance from the passage.

26 Claims, 12 Drawing Sheets

FIG.19(a)
FIG.19(b)
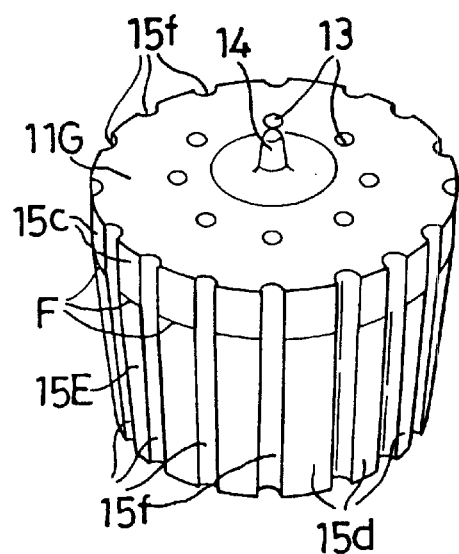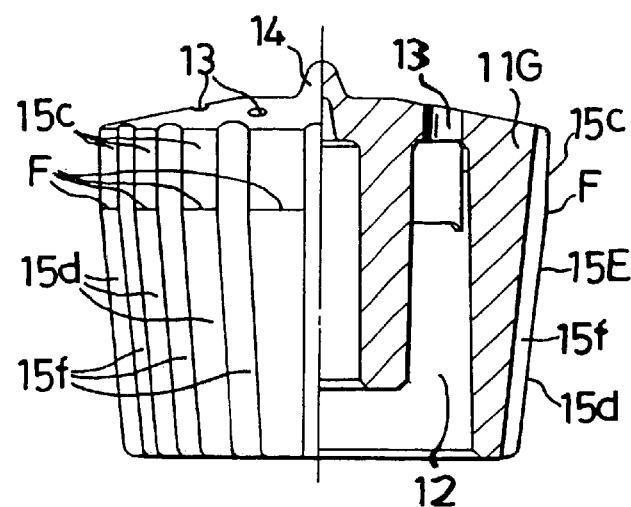

VALVE

BACKGROUND OF THE INVENTION

1. Field of the Invention

This invention relates to a valve for a vehicle fuel tank, more particularly to an anti-spill valve for installation in the top of the fuel tank of a vehicle, particularly an automobile, for preventing pressure buildup in the tank during normal operation by allowing internal tank pressure to escape to the exterior and for preventing spillage of gasoline to the exterior when the vehicle suddenly accelerates, turns sharply or overturns.

2. Description of the Prior Art

FIG. 20 is a cross-sectional diagram of a prior art valve, and FIG. 21 shows the valve of FIG. 20 turned sideways. In FIGS. 20 and 21, reference numeral 1 denotes a housing formed of synthetic resin, comprising a housing unit 2 and a detachable cap 7. The housing unit 2 has a passage 3a that communicates with the outside, provided in the center of the housing unit 2. Going toward the interior of the housing unit 2, the passage 3a expands into a conical valve seat 3b formed in a round ceiling 3. From the outer edge of the ceiling 3, a cylindrical side wall 4 extends downward. The side wall 4 is provided with a plurality of holes 4a, a plurality of claws 4b around the lower circumference that are thicker toward the upper end, and guide ribs 4c used to guide a float 11 (described below). The guide ribs 4c are of equal height and are disposed axially at set intervals around the inside of the side wall 4. From the center of the ceiling 3, a connecting pipe 5 having a central passage 5a that communicates with the passage 3a extends radially out past the side wall 4. An annular mounting member 6 provided on the outside of the side wall 4 is used to mount the housing unit 2 on a fuel tank.

The cap 7 comprises a cylindrical side wall 8 with radial engaging holes 8a that correspond to the claws 4b on the side wall 4 and float guide ribs 8b disposed axially at set intervals around the inside surface, and a bottom 9 that closes the lower end of the side wall 8. The bottom 9 has a plurality of vertical holes 9a that enable the bottom 9 to function as a filter. Reference numeral 11 denotes a float housed in the housing 1. The float 11 is cylindrical in shape and formed of synthetic resin. The lower end of the float 11 has an annular concave portion 12, and is provided with a plurality of vertical through holes 13 that communicate with the concave portion 12, and a valve head 14 that projects up from the top of the float and operates to open and close the passage 3a by separation from and contact with the valve seat 3b. A coil spring 21 is disposed between the housing bottom 9 and the float 11 to help urge the float 11 upwardly.

Operation of the valve will now be described. The valve is normally mounted on a fuel tank (not shown) with the housing 1 oriented vertically, as shown in FIG. 20. In this state, the float 11 descends under its own weight against the force of the coil spring 21, separating the valve head 14 from the valve seat 3b and opening the passage 3a. Gasoline vapor formed in the fuel tank is therefore able to flow out via the holes 4a and 9a, the space between the side wall 4 and the float 11, and the passages 3a and 5a, preventing the pressure inside the fuel tank becoming elevated.

Although a buoyant force acts on the float 11 when gasoline enters the housing 1 through the holes 9a owing to a large inertial force produced by rapid acceleration or sharp turning of the vehicle, this force alone is not strong enough to raise the float 11 since the specific gravity of the float 11 is greater than that of the gasoline. However, the buoyant force combined with the weak force of the spring 21 acting upwardly on the float is sufficient to raise the float and bring the valve head 14 into close contact with the valve seat 3b, closing the passage 3a and thereby preventing gasoline from flowing out of the fuel tank. When the vehicle returns to a normal state and gasoline in the housing 1 flows back through the holes 9a into the fuel tank, under its own weight the float 11 descends, compressing the spring 21, whereby the valve head 14 separates from the valve seat 3b, opening the passage 3a. If the vehicle should turn over onto its side, the valve will also be turned sideways, as shown in FIG. 21, and the force of the coil spring 21 will move the float 11 in the direction of the passage 3a until the passage 3a is closed by the abutment of the valve head 14 against the valve seat 3b, thus preventing gasoline in the fuel tank spilling to the outside.

In the prior art valve, a clearance h is provided between the guide ribs 4c and the float 11 to allow the float 11 to move smoothly. Therefore, if the vehicle falls on its side, as shown in FIG. 21, the center axis of the valve head 14 (the axis of the float 11) is subjected to a parallel displacement down from the axis of the passage 3a by the amount of the clearance h. In this state, even if the float 11 is moved with the intention of closing the passage 3a with the valve head 14, the valve head 14 will contact the lower sloping face of the conical valve seat 3b.

In order to have the valve head 14 close the passage 3a, a force is required that lifts the valve head 14. This force is provided by the coil spring 21, but the lifting force is reduced by the high frictional resistance that exists between the sloping portion of the valve seat 3b and the valve head 14. Since this can prevent the passage 3a being promptly and fully closed by the valve head 14, gasoline can leak from the fuel tank.

This invention was accomplished in response to the foregoing circumstances and has as an object to provide a valve that, even when turned sideways, can suppress leakage of fuel to the exterior by promptly closing a passage that communicates with the outside.

SUMMARY OF THE INVENTION

For achieving the aforesaid object, the invention provides a valve comprising a housing having an outside-communicating passage and a float provided in the housing that opens and closes the passage by moving axially along the housing, the valve being provided with a float guide means that guides the float to close the passage by means of a gap formed between an inner surface of the housing and an outer surface of the float that increases in size with increasing distance from the passage.

The guide means comprises a float tapered portion provided on the cuter surface of the float that tapers in with increasing distance from the passage, the tapered portion being provided from the outer peripheral edge at the passage end of the float, to where a plane that passes through the center of gravity of the float and is orthogonal to the float axis, intersects the outer surface of the float. The guide means can also be provided on the inner surface of the housing as a housing tapered portion that narrows the housing toward the passage end.

In another aspect of the invention, the float is provided with a pivot support portion at a junction between a float cylindrical surface and a float tapered portion, that is located at a point on the side face of the float intersected by a plane that passes through the center of gravity of the float and is orthogonal to the float axis, and the float tapered portion tapers in away from the passage end. The pivot support portion can be located at a junction between first and second float tapered portions constituting the float tapered portion.

The pivot support portion can be provided as a portion that extends around the whole peripheral surface, or it can be provided as a plurality of sections. When it is provided as a plurality of sections, a plurality of grooves can be used to divide the pivot support portion into a plurality of pivot support portions on the outer surface of the float. Alternatively, the pivot support portion can be divided into a plurality of pivot support portions by providing the outer surface of the float with a plurality of grooves extending parallel to the axis of the float.

As described above, in accordance with the present invention, a configuration is used in which the gap between the inner surface of the housing and the outer surface of the float is larger away from the passage than it is near the passage, which is used to guide the float toward the passage when the valve is turned onto its side. At the point at which the float abuts against the lower part of the angled surface forming the valve seat, or against the ceiling, since the distance between the center axis of the passage and the center axis of the valve head is smaller than in a prior art valve configuration, there is less frictional resistance between the float and the angled surface of the valve seat or the ceiling. Therefore, although the float is urged with the same spring force, the result is that the front of the float is lifted with a larger force than the force used to lift the float in the case of a prior art valve. Thus, the float can quickly close the passage, stopping any leakage of gasoline.

The invention also includes float provided with a pivot support portion about which the float can pivot. In this case, when the valve is turned onto its side, the force of the spring rotates the float as the float is urged forward to stop leakage of gasoline by closing the passage by abutting the valve head against the valve seat.

In accordance with another aspect, a plurality of grooves are provided around the outer surface of the float, with each groove extending axially with respect to the float. When the float reverts to its normal state, this arrangement prevents the float sticking to side walls.

The above and other objects, features and advantages of the present invention will become apparent from the following description made with reference to the accompanying drawings.

BRIEF EXPLANATION OF THE DRAWINGS

FIG. 19($a$) is a perspective view of an example of a float of the invention that is provided on its outer surface with a plurality of pivot support portions.

FIG. 19($b$) shows the float shown in FIG. 19($a$), with the right half thereof sectioned.

DESCRIPTION OF THE PREFERRED EMBODIMENTS

Figure 1:
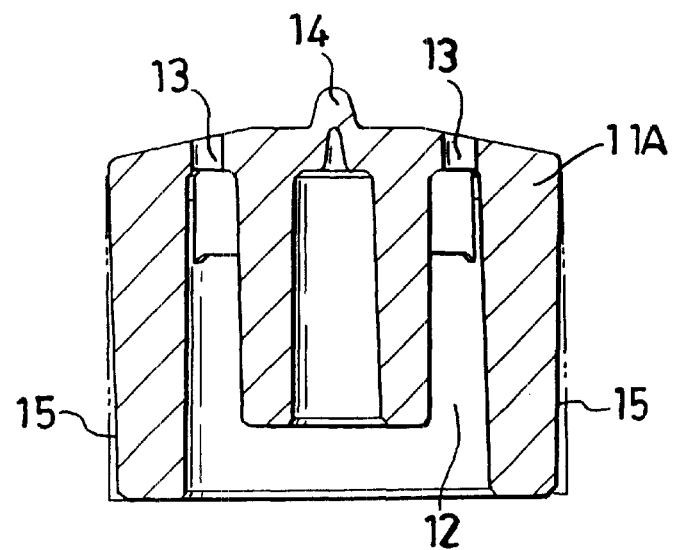
FIG. 1 shows a float used to form the valve of the present invention.
Figure 2:
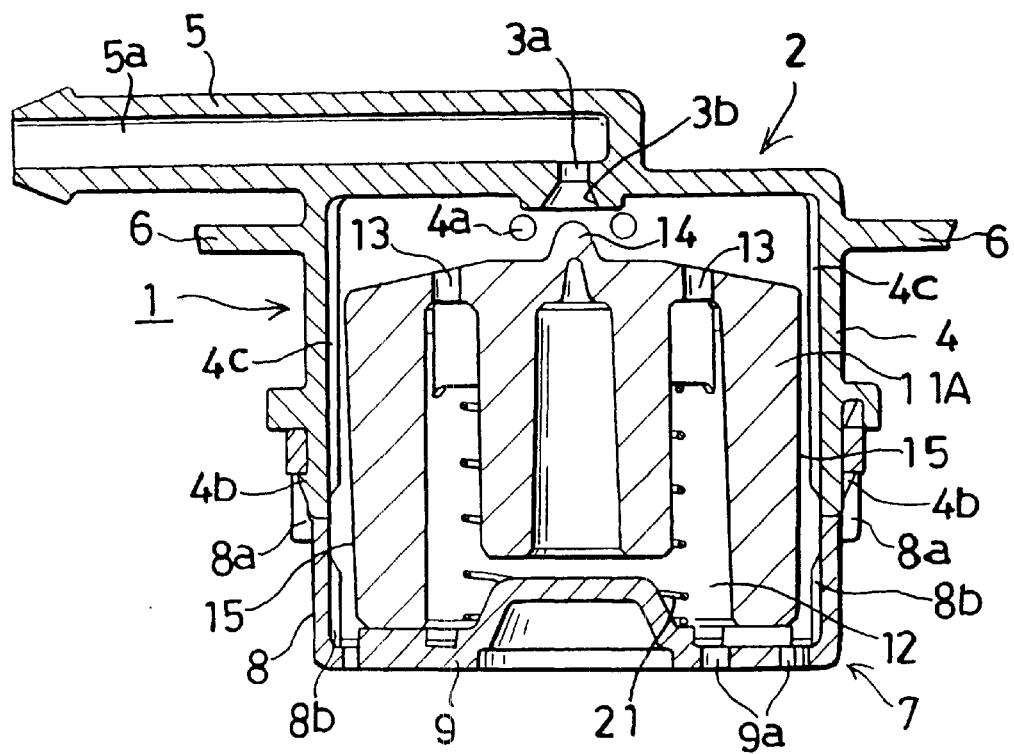
FIG. 2 is a cross-sectional view of a valve that uses the float of FIG. 1, according to a first embodiment of the invention.
Figure 3:
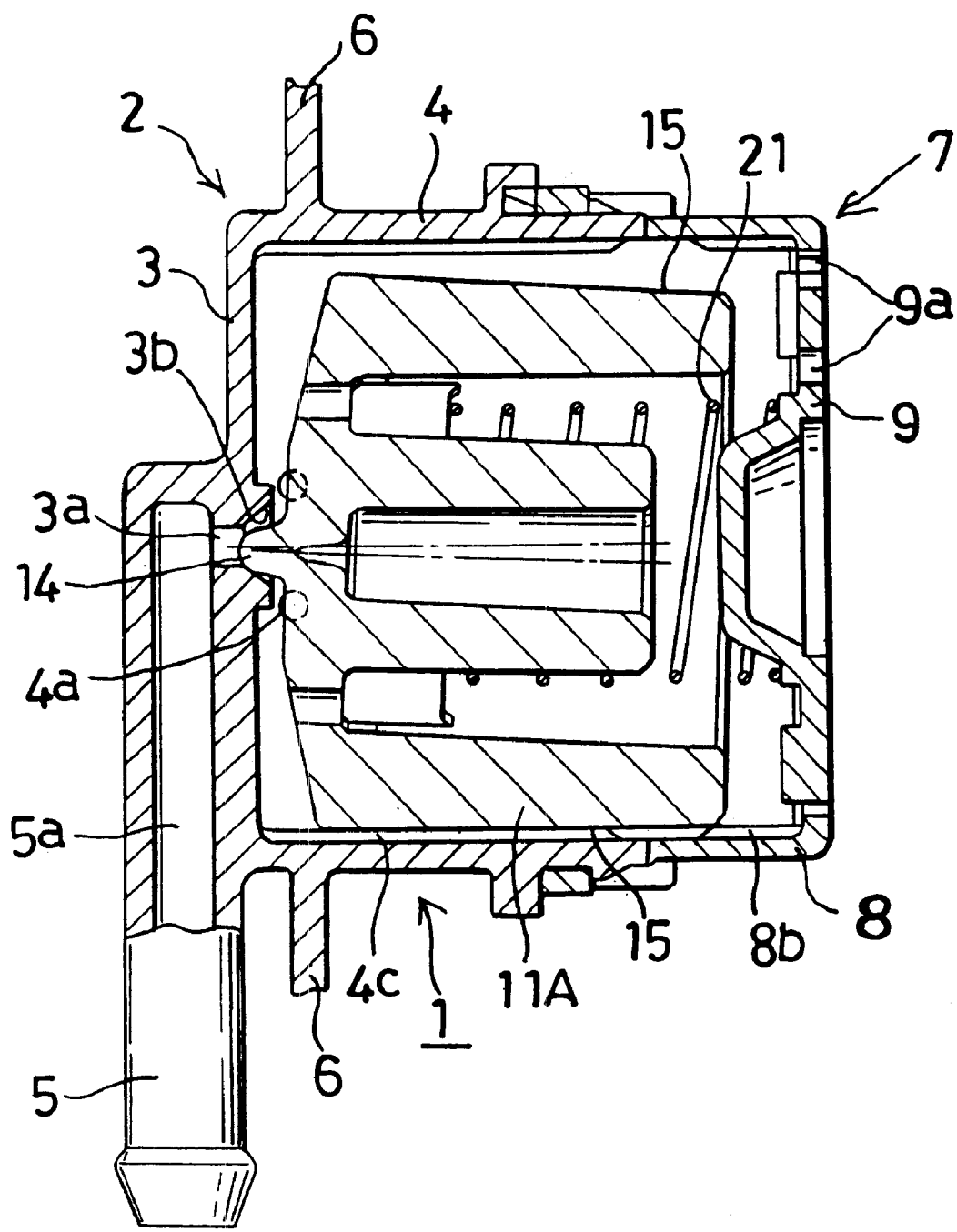
FIG. 3 shows the valve of FIG. 2 turned sideways.
Figure 20:
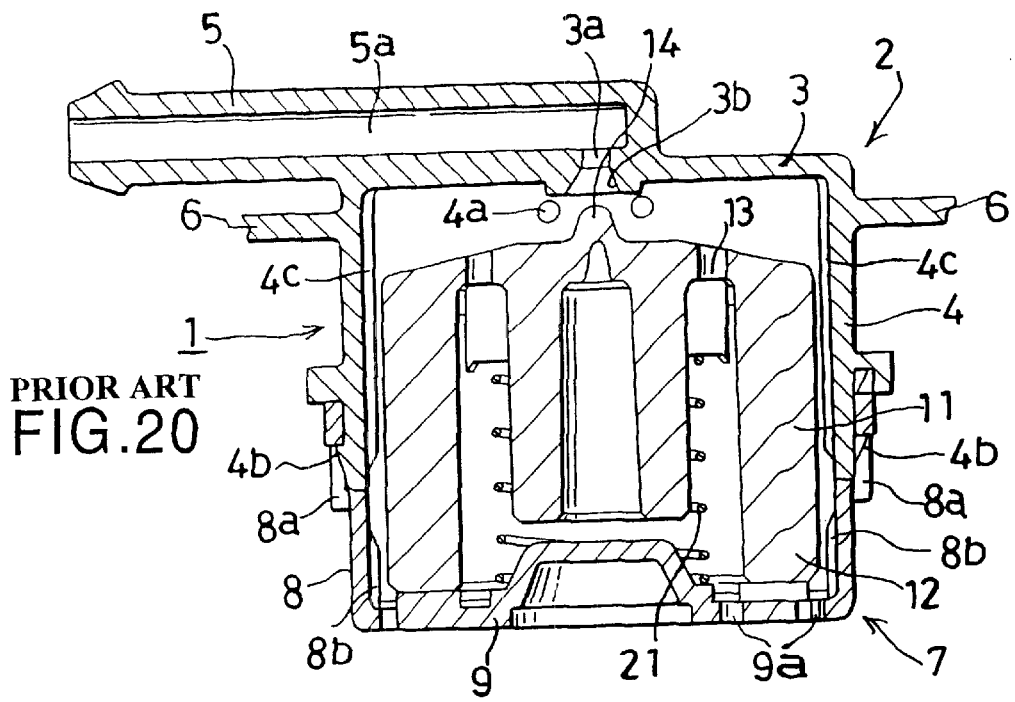
FIG. 20 is a cross-sectional view of a prior art valve.
Figure 21:
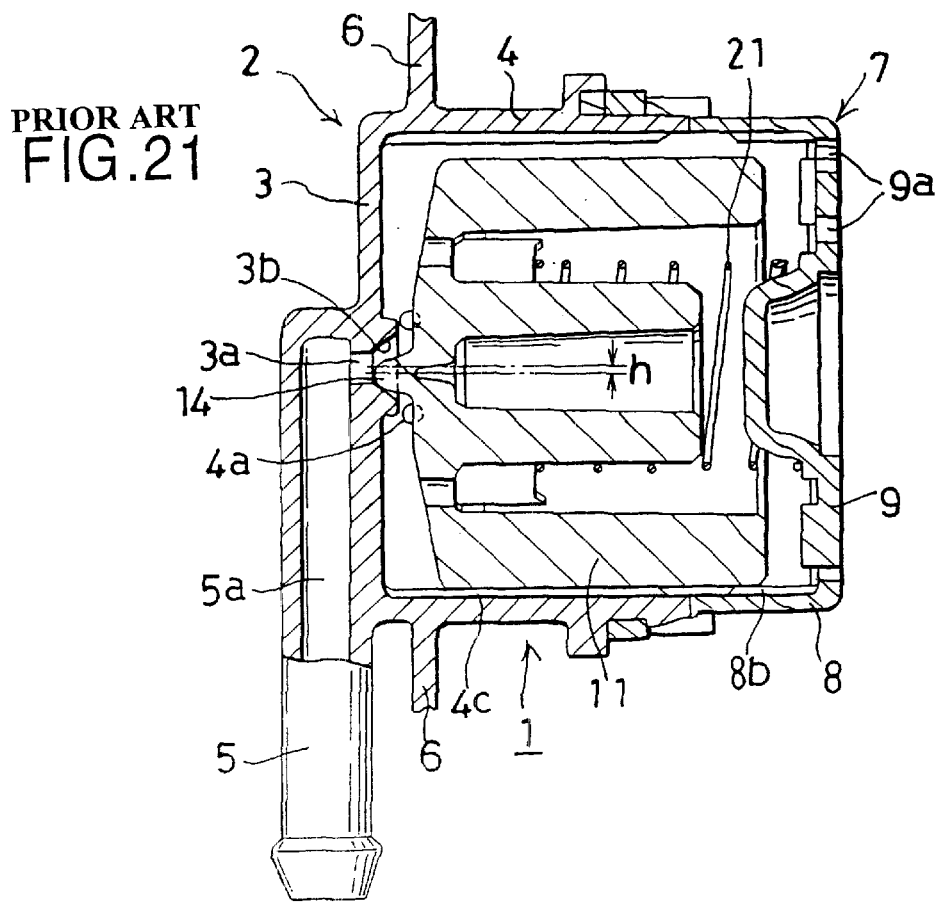
FIG. 21 shows the valve of FIG. 20 turned sideways.

FIG. 1 shows the arrangement of a float forming the valve of this invention, FIG. 2 is a cross-sectional view of a first embodiment of the valve of the invention that uses the float shown in FIG. 1, and FIG. 3 shows the valve of FIG. 2 turned on its side. Parts that are the same as or equivalent to parts in FIG. 20 or 21 are given identical reference symbols, and further explanation thereof is omitted.

In FIGS. 1 to 3, reference symbol 11A denotes a float inside a housing 1. The float 11A is formed of synthetic resin and has a concave portion 12, holes 13, a valve head 14 and a guide means that, when the valve is turned sideways, guides the float so that the passage 3$a$ is closed by the valve head 14. The guide means comprises a tapered portion 15 on the outer surface of the float 11A formed by a conical surface 15$a$. The tapered portion narrows as the distance from the valve head 14 increases. Hence, the float 11A is shaped like a truncated cone that narrows toward the cap 7 end. The outside two-dot chain line in FIG. 1 indicates the shape of the prior art float 11.

The valve will now be described with reference to how it operates differently from the prior art valve when the vehicle in which it is used has turned over, therefore turning the valve on its side.

In order to allow smooth movement of the float 11A, a clearance h is provided between the housing guide ribs 4$c$ and the float 11A. When the vehicle rolls over onto its side, as shown in FIG. 3, the center axis of the valve head 14 is displaced downward from the center axis of the passage 3$a$. Since the float 11A is truncated-conical, the gap between the centers of the valve head 14 and passage 3$a$ becomes narrower at the valve head 14 end and wider at the cap 7 end.

Therefore, when the float 11A is moved toward the passage 3$a$ end by the force of the coil spring 21, the valve head 14 is brought into contact with the angled surface at the lower end of the valve seat 3b and, because the distance between the center axes of the passage 3a and valve head 14 is less than in the case of the prior art configuration, there is less frictional resistance between the face of the valve seat 3b and the valve head 14. Therefore, even with the urging force of the coil spring 21 being the same, the valve head 14 end is lifted with a larger force in the case of the float 11A, enabling the passage 3a to be rapidly fully closed by the valve head 14. Thus, gasoline leakage can be reduced and stopped.

Figure 4:
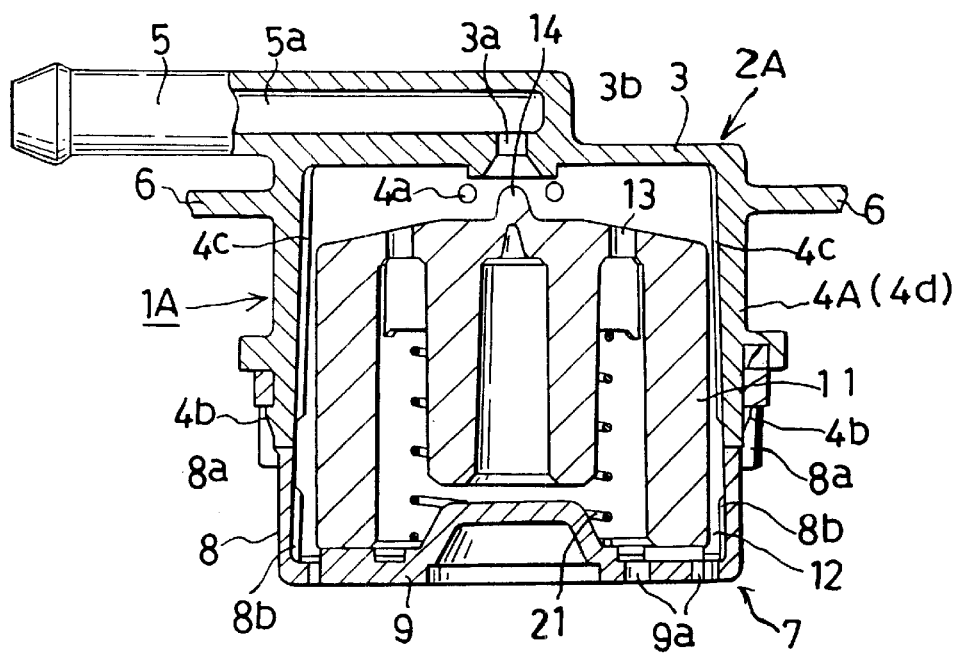
FIG. 4 is a cross-sectional view of a valve according to a second embodiment of the invention.
Figure 5:
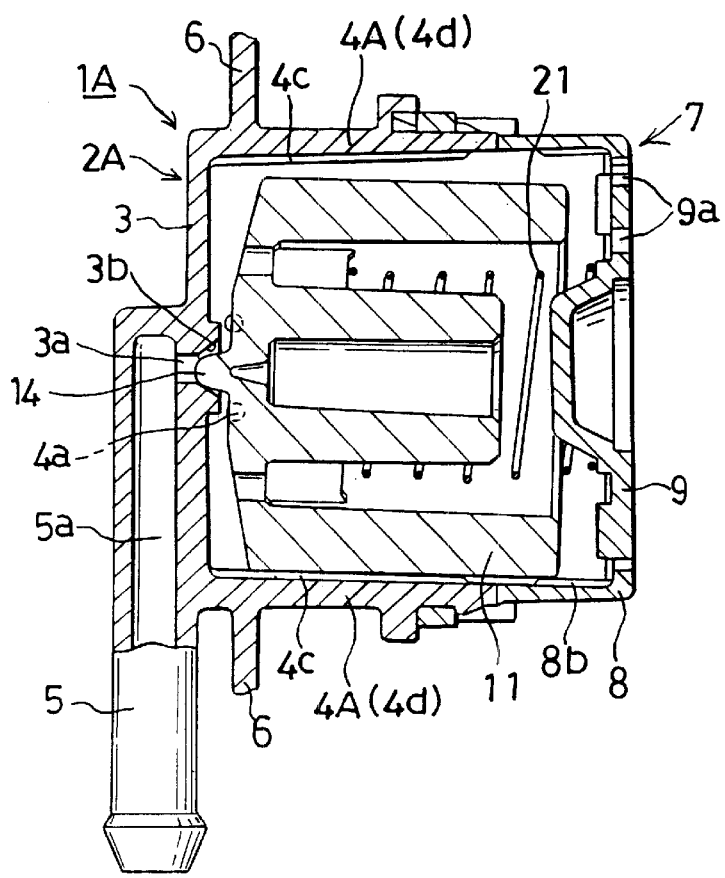
FIG. 5 shows the valve of FIG. 4 turned sideways.

FIG. 4 is a cross-sectional view of a second embodiment of the valve of the invention, and FIG. 5 shows the valve or FIG. 4 turned on its side. Parts that are the same as or equivalent to parts in FIGS. 1 to 3 or FIGS. 20 and 21 are given identical reference symbols, and further explanation thereof is omitted. In FIGS. 4 and 5, reference symbol 1A denotes a synthetic resin housing comprised of a housing unit 2A and a cap 7. The housing unit 2A has a ceiling 3 provided with a passage 3a and a valve seat 3b, a side wall 4A provided with holes 4a, claws 4b and guide ribs 4c, and guide means for guiding the float 11 so that the valve head 14 closes the passage 3a when the valve is turned on its side. There is also a connecting pipe 5 with a passage 5a, and an annular mounting member 6.

As shown in FIGS. 4 and 5, the guide means comprises a housing sloping portion 4d on the inner surface of the side wall 4A that slopes inward going toward the passage 3a end. The sloping portion 4d can be replaced by the guide ribs 4c positioned at set intervals that are angled inward as they rise up toward the passage 3a.

The valve will now be described with reference to how it operates differently from the prior art valve when the vehicle in which it is used has rolled over, turning the valve on its side.

To ensure smooth movement of the float 11, a clearance (h) is provided between the guide ribs 4c and the float 11A. Therefore, when the vehicle rolls over onto its side, as shown in FIG. 5, the center axis of the valve head 14 is displaced downward from the center axis of the passage 3a. The sloping portion 4d on the side wall 4A means that the distance between the center axes of the valve head 14 and passage 3a is smaller at the valve head 14 end and larger at the cap 7 end. Consequently, when the float 11 is moved toward the passage 3a by the force of the coil spring 21, bringing the valve head 14 into contact with the angled surface at the lower end of the valve seat 3b, since the distance between the center axes of the passage 3a and valve head 14 is less than in the case of the prior art configuration, there is less frictional resistance between the face of the valve seat 3b and the valve head 14. Therefore, even with the urging force of the coil spring 21 being the same, the valve head 14 end of the float 11 can be lifted with a larger force, enabling the passage 3a to be speedily closed by the valve head 14. Thus, gasoline leakage can be reduced and stopped.

Figure 6:
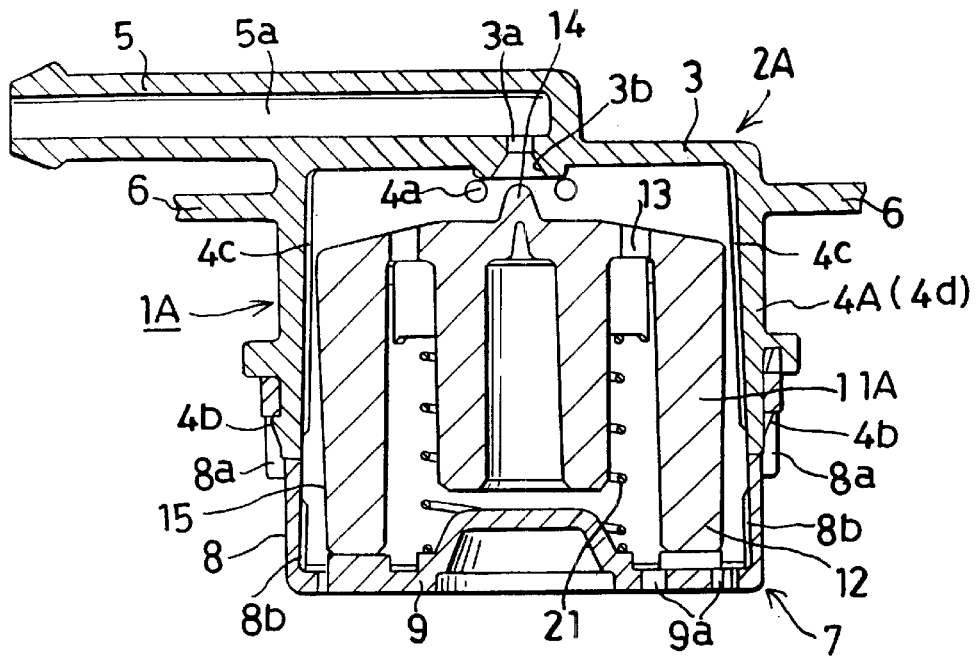
FIG. 6 is a cross-sectional view of a valve according to a third embodiment of the invention.
Figure 7:
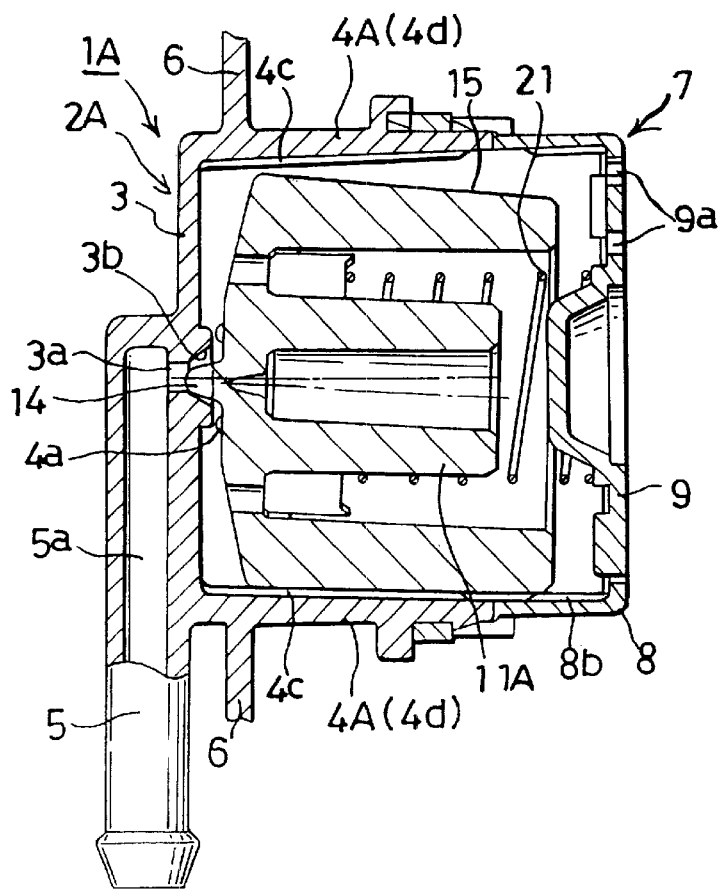
FIG. 7 shows the valve of FIG. 6 turned sideways.

FIG. 6 is a cross-sectional view of a third embodiment of the valve of the invention, and FIG. 7 shows the valve of FIG. 6 turned on its side. Parts that are the same as or equivalent to parts in FIGS. 1 to 5 or FIGS. 20 and 21 are given identical reference symbols, and a further explanation thereof is omitted.

The valve will now be described with reference to how it operates differently from the prior art valve when the vehicle in which it is used has rolled over, turning the valve on its side.

To ensure smooth movement of the float 11, a clearance h is provided between the guide ribs 4c and the float 11A. Therefore, when the vehicle rolls over onto its side, as shown in FIG. 7, the center axis of the valve head 14 is displaced downward from the center axis of the passage 3a. Since the float 11A is in the shape of a truncated cone, with the smaller end toward the cap 7, the distance between the center axes of the valve head 14 and passage 3a is smaller at the valve head 14 end and larger at the cap 7 end. As such, when the float 11 is moved toward the passage 3a by the force of the coil spring 21, bringing the valve head 14 into contact with the angled surface at the lower end of the valve seat 3b, since the distance between the center axes of the passage 3a and valve head 14 is less than in the case of the prior art configuration, there is less frictional resistance between the face of the valve seat 3b and the valve head 14. Therefore, even with the urging force of the coil spring 21 being the same, the valve head 14 end of the float 11A can be lifted with a larger force, enabling the passage 3a to be speedily closed by the valve head 14. Gasoline leakage therefore can be reduced and stopped.

Figure 8:
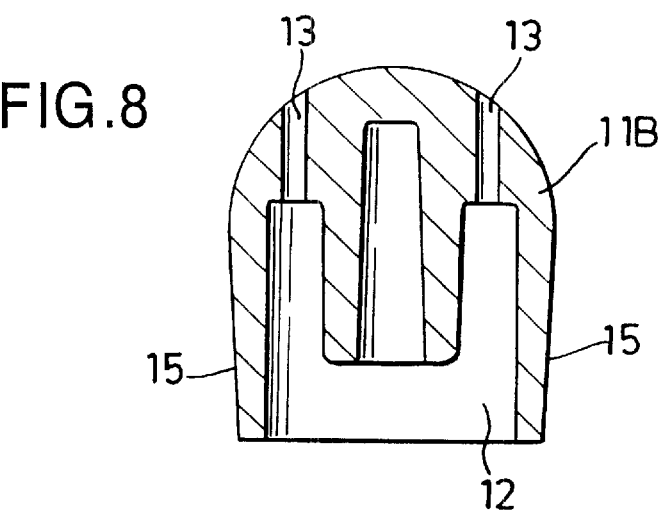
FIG. 8 shows a float used to form the valve of this invention.
Figure 9:
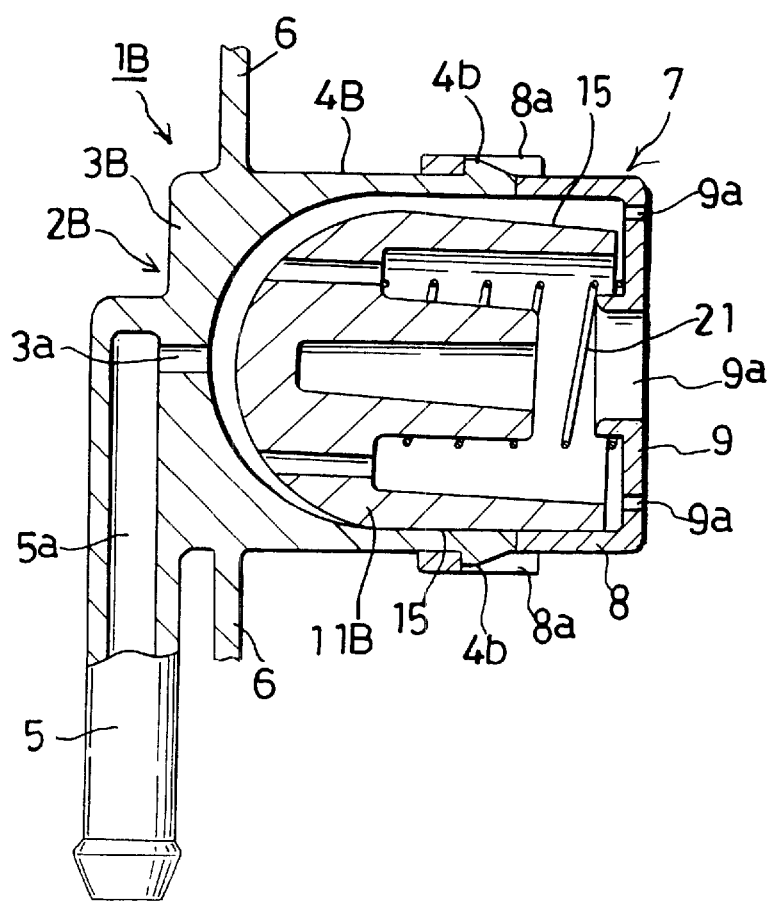
FIG. 9 shows the float of FIG. 8 used in a valve turned sideways that is a fourth embodiment of the present invention.

FIG. 8 illustrates a valve float of this invention, and FIG. 9 shows the float of FIG. 8 used in a valve turned on its side that is a fourth embodiment of the invention. Parts that are the same as or equivalent to parts in FIGS. 1 to 7 or FIGS. 20 and 21 are given identical reference symbols, and further explanation thereof is omitted. In FIGS. 8 and 9, reference symbol 2B denotes a synthetic resin housing comprising a housing unit 2B and a cap 7. The housing unit 2B comprises a hemispherical ceiling 3B with a passage 3a, a side wall 4B with holes 4a and claws 4b, a connecting pipe 5 with a passage 5a, and an annular mounting member 6. In FIGS. 8 and 9, reference symbol 11B denotes a float inside the housing 1B. The float 11B is cylindrical in shape and formed of synthetic resin with a concave portion 12 and holes 13. It has a hemispherical top, and a guide means that, when the valve is turned on its side, guides the float so that the hemispherical top closes the passage 3a.

As shown in FIG. 8, the guide means is comprised of a float tapered portion 15 whereby the outer surface of the float 11B tapers in from the upper end. The valve will now be described with reference to how it operates differently from the prior art valve when the vehicle in which it is used has rolled over, turning the valve on its side. To ensure smooth movement of the float 11B, a clearance (h) is provided between the side wall 4B and the float 11B. As a result, when the vehicle rolls over onto its side, tilting the valve onto its side, as shown in FIG. 9, the center axis of the float 11B is displaced downward from the center axis of the passage 3a. Since the float 11B tapers down in size toward the cap 7, the distance between the center axes is smaller at the top end of the float 11B and larger at the cap 7 end. Therefore, when the float 11B is moved toward the passage 3a by the force of the coil spring 21, bringing the lower part of the float top into contact with the lower part of the ceiling 3B, since the distance between the center axes of the passage 3a and valve head 14 is less than in the case of a prior art configuration, there is less frictional resistance between the ceiling 3B and the float 11B. Therefore, even with the urging force of the coil spring 21 being the same, the float 11B can be forced up to the passage 3a, making it possible to speedily close the passage 3a. Gasoline leakage therefore can be reduced and stopped.

Figure 10:
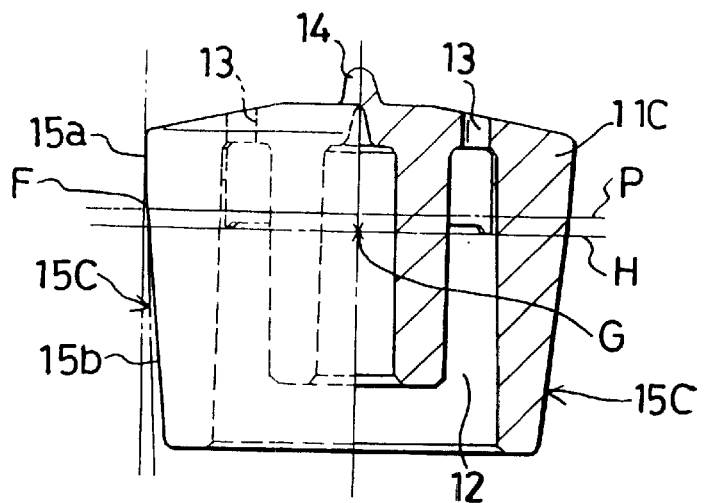
FIG. 10 shows a float used to form the valve of this invention, with the right half thereof sectioned.
Figure 11:
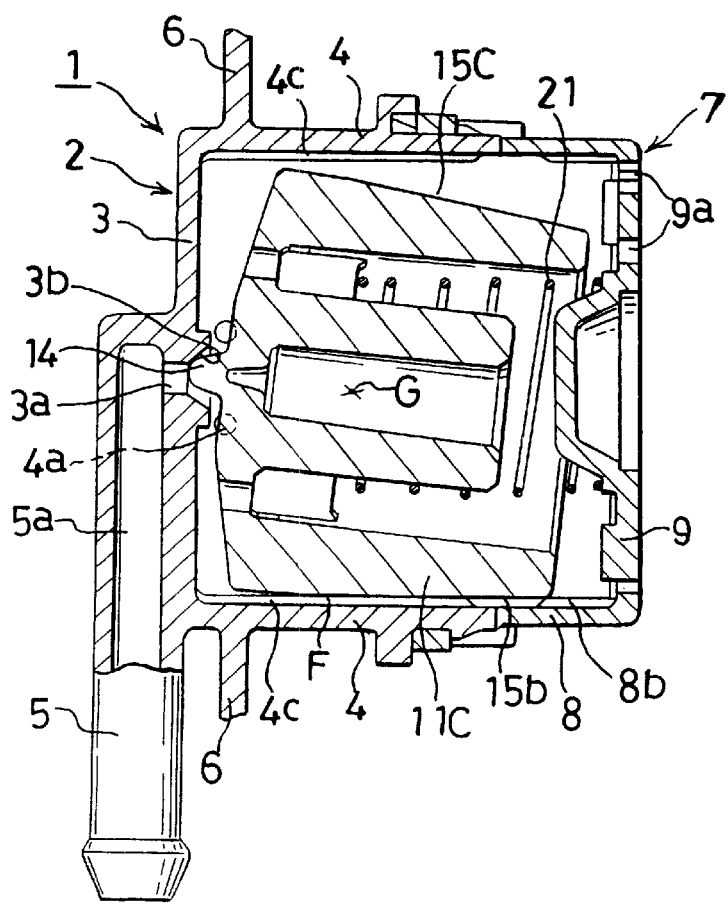
FIG. 11 shows the float of FIG. 10 used in a valve turned sideways that is a fifth embodiment of the present invention.

FIG. 10 illustrates a valve float of the invention, with the right half shown in cross-section, and FIG. 11 shows the float of FIG. 10 used in a valve turned on its side according to a fifth embodiment of the invention. Parts that are the same as or equivalent to parts in FIGS. 1 to 9 or FIGS. 20 and 21 are given identical reference symbols, and further explanation thereof is omitted.

In FIGS. 10 and 11, reference symbol 11C denotes a float inside the housing 1. The float 11C is formed of synthetic resin and is provided with the above-described concave portion 12, holes 13 and valve head 14. It also has guide means that, when the valve is turned on its side, guides the float to close the passage 3a with the valve head 14. As shown in FIG. 10, the guide means is comprised of a float tapered portion 15C that tapers in the outer surface of the float 11C from the upper end; the float tapered portion 15C is comprised of conical surfaces 15a and 15b. The junction (pivot support portion) F between the conical surfaces 15a and 15b is located at a point on the side face of the float 11C intersected by a plane P that is parallel to, and on the upper side of, a plane H that passes through the center of gravity G of the float 11C and is orthogonal to the axis X of the float 11C. Thus, in shape the float 11C is formed by joining together two truncated cones that taper down toward the cap 7 end. In FIG. 10, the two-dot chain line indicates the shape of the prior art float 11, and the one-dot chain line indicates an extension of the conical surface 15a. The end of the float tapered portion 15C on the passage 3a side, that is, the conical surface 15a end, is located on the largest-diameter outer peripheral edge on the passage 3a side.

The valve will now be described with reference to how it operates differently from the prior art valve when the vehicle in which it is used has rolled over, turning the valve on its side. A clearance (h) is provided between the guide ribs 4c and the float 11C to allow the float 11C to move smoothly. Therefore, if the vehicle rolls over onto its side, as shown in FIG. 11, the center axis of the valve head 14 is displaced down from the center axis of the passage 3a by the amount of the clearance (h). At this time, because the center of gravity G is to the right of the junction F, the conical surface 15b of the float 11C contacts the guide ribs 4c. Also, since the float 11C is narrower toward the cap 7 end, the center axes of the valve head 14 and passage 3a intersect slightly to the right of the passage 3a and are closer together at the top end of the float 11C than at the cap end.

Therefore, when the float 11C is urged toward the passage 3a by the force of the coil spring 21, the valve head 14 is brought into contact with the upper part of the angled surface forming the valve seat 3b, and under the urging of the coil spring 21, the float 11C is turned counterclockwise about the junction F as it is moved toward the passage 3a. Therefore, even though the urging force of the coil spring 21 is the same, the operation of closing the passage 3a with the valve head 14 is effected more rapidly than in the case of the prior art or the first four embodiments, enabling leakage of gasoline to be reduced and stopped.

Figure 12:
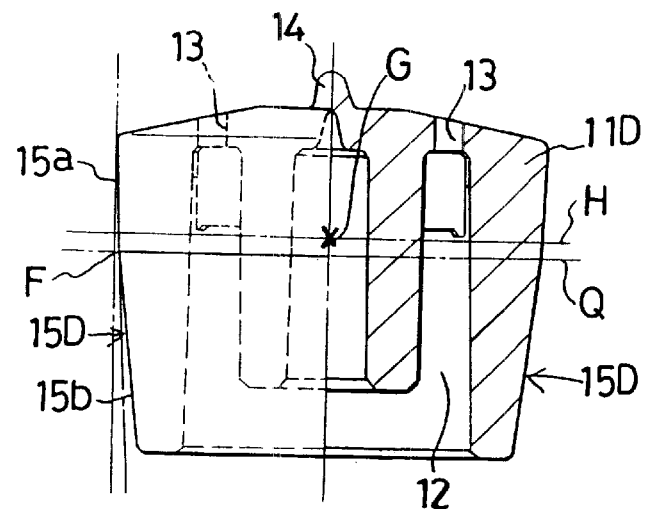
FIG. 12 shows a float used to form the valve of this invention, with the right half thereof sectioned.
Figure 13:
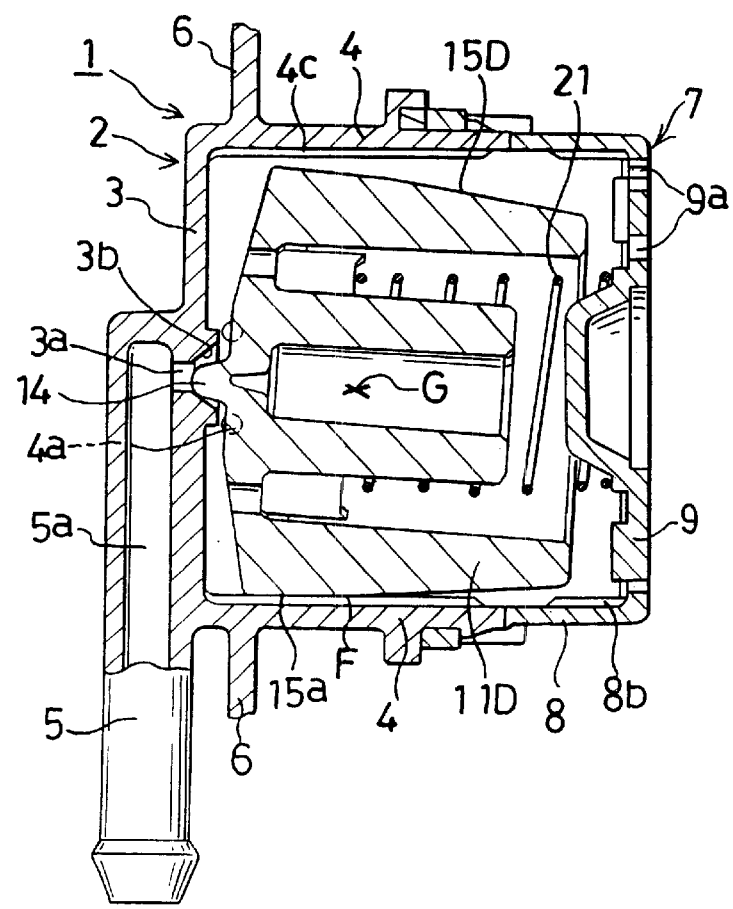
FIG. 13 shows the float of FIG. 12 used in a valve turned sideways that is a sixth embodiment of the present invention.

FIG. 12 illustrates a valve float of the invention, with the right half shown in cross-section, and FIG. 13 shows the float of FIG. 12 used in a valve turned on its side according to a sixth embodiment of the invention. Parts that are the same as or equivalent to parts in FIGS. 1 to 11 or FIGS. 20 and 21 are given identical reference symbols, and further explanation thereof is omitted.

In FIGS. 12 and 13, reference symbol 11D denotes a float inside a housing 1. The float 11D is formed of synthetic resin and has a concave portion 12, holes 13, a valve head 14, and a guide means that, when the valve is turned sideways, guides the float to close the passage 3a with the valve head 14. As shown in FIG. 12, the guide means is comprised of a float tapered portion 15D that tapers in the outer surface of the float 11D from the upper end. The float tapered portion 15D is comprised of conical surfaces 15a and 15b. The junction (pivot support portion) F between the conical surfaces 15a and 15b is located at a point on the side face of the float 11D intersected by a plane Q that is parallel to, and on the lower side of, a plane H that passes through the center of gravity G of the float 11D and is orthogonal to the axis X of the float 11D. Thus, in shape the float 11D is formed by joining together two truncated cones that taper down toward the cap 7 end. The two-dot chain line indicates the shape of the prior art float 11, and the one-dot chain line indicates an extension of the conical surface 15a. The end of the float tapered portion 15D on the passage 3a side, that is, the conical surface 15a end, is located on the largest-diameter outer peripheral edge on the passage 3a side.

The valve will now be described with reference to how it operates differently from the prior art valve when the vehicle in which it is used has rolled over, turning the valve on its side. A clearance (h) is provided between the guide ribs 4c and the float 11D to allow the float 11D to move smoothly. Therefore, if the vehicle rolls over onto its side, as shown in FIG. 13, the center axis of the valve head 14 is displaced downward from the center axis of the passage 3a by the amount of the clearance (h). At this time, because the center of gravity G is above or to the left of the junction F, the conical surface 15a of the float 11D contacts the guide ribs 4c. Since the float 11D is narrower toward the cap 7 end, the gap between the center axes of the float 11D and passage 3a is smaller toward the valve head 14 end and larger at the cap 7 end.

Therefore, when the float 11D is moved toward the passage 3a by the force of the coil spring 21, the valve head 14 comes into contact with the lower part of the angled surface forming the valve seat 3b, and under the urging of the coil spring 21, the float 11D is turned clockwise about the junction F as it is moved toward the passage 3a. Therefore, even though the urging force of the coil spring 21 is the same, the operation of closing the passage 3a with the valve head 14 is effected more rapidly than in the case of the prior art or the first four embodiments, enabling leakage of gasoline to be reduced and stopped.

Figure 14:
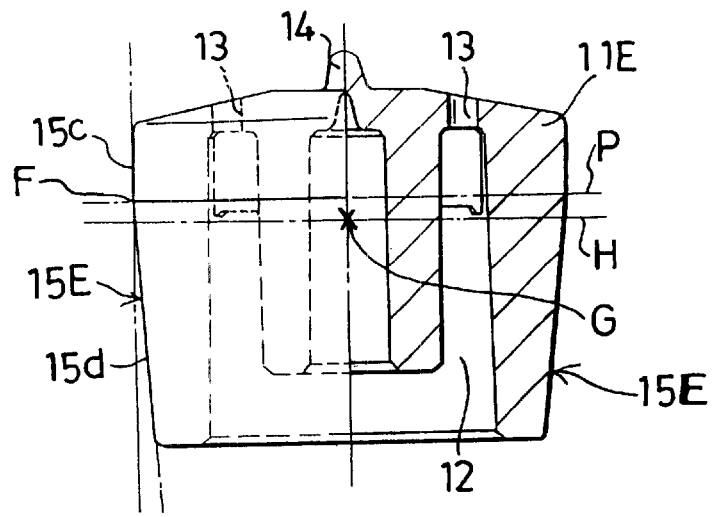
FIG. 14 shows a float used to form the valve of this invention, with the right half thereof sectioned.
Figure 15:
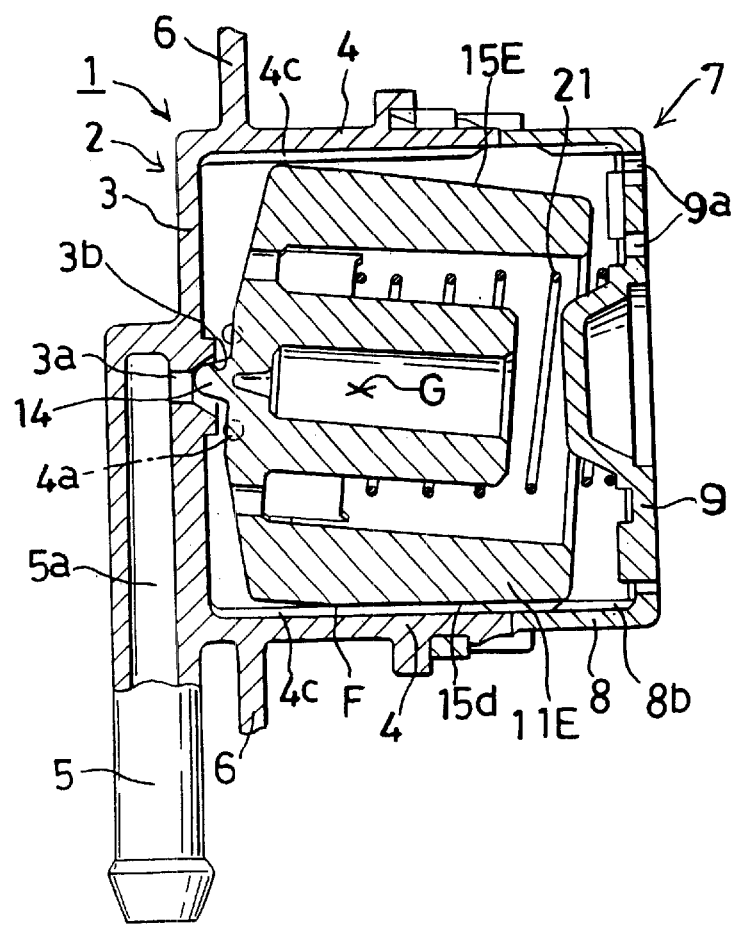
FIG. 15 shows the float of FIG. 14 used in a valve turned sideways that is a seventh embodiment of the present invention.

FIG. 14 illustrates a valve float according to the invention, with the right half shown in cross-section, and FIG. 15 shows the float of FIG. 14 used in a valve turned on its side according to a seventh embodiment of the invention. Parts that are the same as or equivalent to parts in FIGS. 1 to 13 or FIGS. 20 and 21 are given identical reference symbols, and further explanation thereof is omitted.

In FIGS. 14 and 15, reference symbol 11E denotes a float inside a housing 1. The float 11E is formed of synthetic resin and has a concave portion 12, holes 13, a valve head 14, and a guide means that, when the valve is turned sideways, guides the float to close the passage 3a with the valve head 14. As shown in FIG. 14, the guide means is comprised of a float tapered portion 15E that comprises a cylindrical surface 15c provided on the outer surface of the float 11E and a conical surface 15d that tapers the float 11E in from the end of the cylindrical surface 15c. The junction (pivot support portion) F between the cylindrical surface 15c and the conical surface 15d is located at a point on the side face of the float 11E intersected by a plane P that is parallel to, and on the upper side of, a plane H that passes through the center of gravity G of the float 11E and is orthogonal to the axis X of the float 11E. Thus, the float 11E is in the shape of a cylinder joined to a truncated cone that tapers in toward the cap end.

The valve will now be described with reference to how it operates differently from the prior art valve when the vehicle in which it is used has rolled over, turning the valve on its side. A clearance (h) is provided between the guide ribs 4c and the float 11E to allow the float 11E to move smoothly. Therefore, if the vehicle rolls over onto its side, as shown in FIG. 15, the center axis of the valve head 14 is displaced downward from the center axis of the passage 3a by the amount of the clearance (h). As the center of gravity G is to the right of the junction F, the conical surface 15d of the float 11E comes into contact with the guide ribs 4c. Since the float 11E is narrower toward the cap 7 end, the center axes of the float 11E and passage 3a intersect slightly to the right of the passage 3a, and the gap between the two axes becomes narrower at the valve head 14 end and wider at the cap 7 end.

Therefore, when the float 11E is moved toward the passage 3a by the force of the coil spring 21 and the valve head 14 comes into contact with the upper part of the angled surface of the valve seat 3b, under the urging force of the coil spring 21 the float 11E is turned counterclockwise about the junction F as it advances toward the passage 3a. Therefore, even though the urging force of the coil spring 21 may be the same, the operation of closing the passage 3a with the valve head 14 is effected more rapidly than in the case of the prior art or the first four embodiments, enabling leakage of gasoline to be reduced and stopped.

Figure 16:
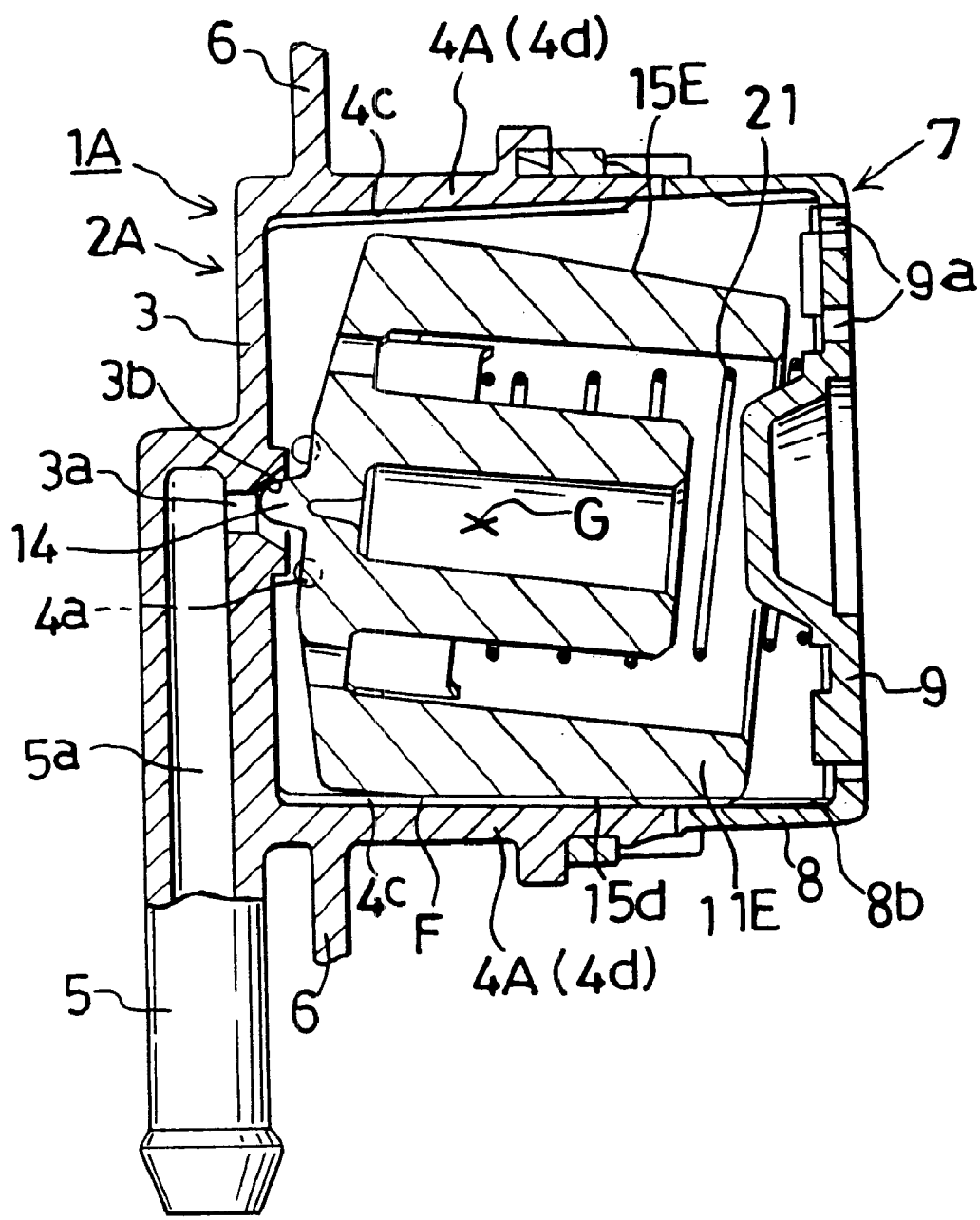
FIG. 16 shows a valve turned sideways that is an eighth embodiment of the invention.

FIG. 16 shows a valve turned on its side that is an eighth embodiment of the invention. Parts that are the same as or equivalent to parts in FIGS. 1 to 15 or FIGS. 20 and 21 are given identical reference symbols, and further explanation thereof is omitted.

The valve will now be described with reference to how it operates differently from the prior art valve when the vehicle in which it is used has rolled over, turning the valve on its side. A clearance (h) is provided between the guide ribs 4c and the float 11E to allow the float 11E to move smoothly. Therefore, if the vehicle rolls over onto its side, as shown in FIG. 16, the center axis of the valve head 14 is displaced downward from the center axis of the passage 3a by the amount of the clearance (h). As the center of gravity G is to the right of the junction F, the conical surface 15d of the float 11E comes into contact with the guide ribs 4c. Since the float 11E is narrower toward the cap 7 end, the center axes of the float 11E and passage 3a intersect slightly to the right of the passage 3a, and the gap between the two axes becomes narrower at the front end of the float 11E and wider at the cap 7 end.

Therefore, when the float 11E is moved toward the passage 3a by the force of the coil spring 21, the valve head 14 comes into contact with the upper part of the angled surface of the valve seat 3b, and under the urging force of the coil spring 21 the float 11E turns counterclockwise about the junction F as it moves toward the passage 3a. Thus, even though the urging force of the coil spring 21 may be the same, the operation of closing the passage 3a with the valve head 14 is effected more rapidly than in the case of the prior art or the first four embodiments, enabling leakage of gasoline to be reduced and stopped.

Figure 17:
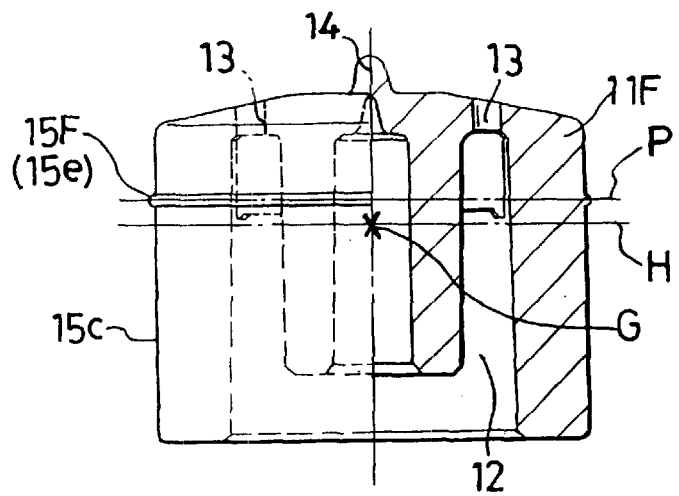
FIG. 17 shows a float used to form the valve of this invention, with the right half thereof sectioned.
Figure 18:
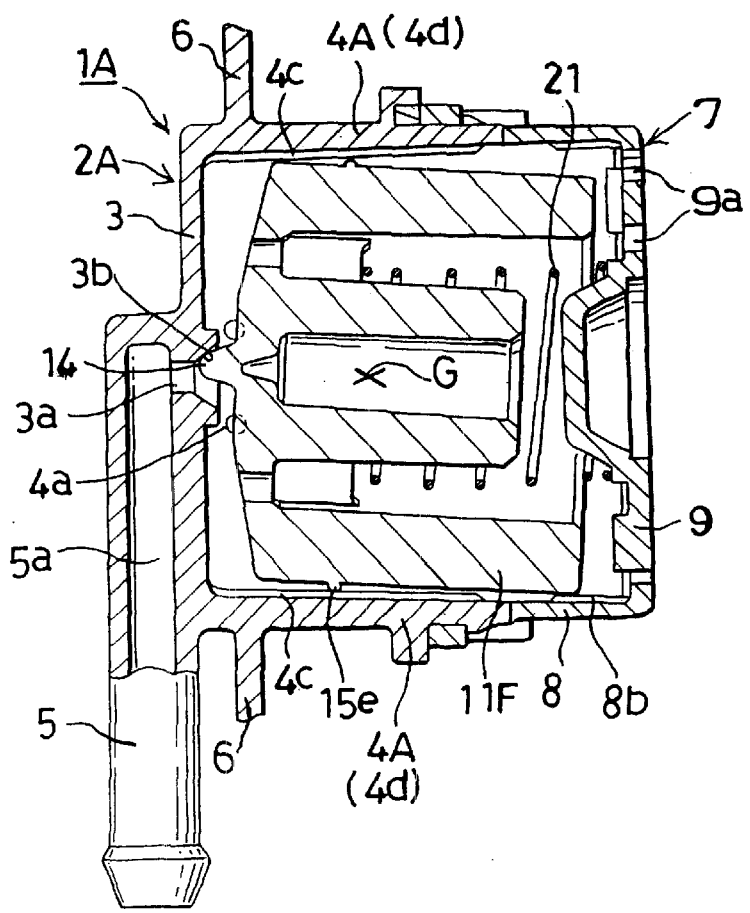
FIG. 18 shows the float of FIG. 17 used in a valve turned sideways that is a ninth embodiment of the present invention.

FIG. 17 illustrates a valve fixed according to the invention, with the right half shown in cross-section, and FIG. 18 shows the float of FIG. 17 used in a valve turned on its side that is a ninth embodiment of the invention. Parts that are the same as or equivalent to parts in FIGS. 1 to 16 or FIGS. 20 and 21 are given identical reference symbols, and further explanation thereof is omitted.

In FIGS. 17 and 18, reference symbol 11F denotes a float inside a housing 1. The float 11F is formed of synthetic resin and has a concave portion 12, holes 13, a valve head 14, and a projecting ridge 15e around the cylindrical surface 15c, the ridge 15e constituting a pivot support portion. The ridge 15e is located at a point on the side face of the float 11F intersected by a plane P that is parallel to, and on the upper side of, a plane H that passes through the center of gravity G of the float 11C and is orthogonal to the axis X of the float 11F.

The valve will now be described with reference to how it operates differently from the prior art valve when the vehicle in which it is used has rolled over, turning the valve on its side. A clearance (h) is provided between the guide ribs 4c and the float 11F to allow the float 11F to move smoothly. Therefore, if the vehicle rolls over onto its side, as shown in FIG. 18, the center axis of the valve head 14 is displaced downward from the center axis of the passage 3a. As the center of gravity G is to the right of the ridge 15e, the ridge 15e of the float 11F contacts the guide ribs 4c and guide ribs 8b. Because of the housing sloping portion 4d on the side wall 4A, the center axes of the valve head 14 and passage 3a intersect slightly to the right of the passage 3a, and the gap between the two axes becomes narrower at the valve head 14 end and wider at the cap 7 end.

Therefore, when the float 11F is moved toward the passage 3a by the force of the coil spring 21, the valve head 14 comes into contact with the upper part of the angled surface of the valve seat 3b, and under the urging force of the coil spring 21 the float 11F turns counterclockwise about the ridge 15e as it moves toward the passage 3a. Thus, even though the urging force of the coil spring 21 may be the same, the operation of closing the passage 3a with the valve head 14 is effected more rapidly than in the case of the prior art or the first four embodiments, enabling leakage of gasoline to be reduced and stopped.

FIG. 19(a) is a perspective view of an example of a float of the invention that is provided on its outer surface with a plurality of pivot support portions; FIG. 19(b) is a view of the float with the right half shown in cross-section. Parts that are the same as or equivalent to parts in FIGS. 1 to 18 or FIGS. 20 and 21 are given identical reference symbols, and further explanation thereof is omitted.

In FIGS. 19(a) and 19(b), reference symbol 11G denotes a float. The float 11G is formed of synthetic resin and has a concave portion 12, holes 13 and a valve head 14. The float 11G also has a guide means 15E that, when the valve is turned onto its side, guides the float to close the passage 3a with the valve head 14. The float 11G also has a plurality of grooves 15f that divide junction F into a plurality of pivot support portions. The grooves 15f are provided at set intervals around the outer surface of the float 11G, each groove 15f extending axially along the float. The grooves 15f are each narrower than the guide ribs 4c and 8b of the housing, to prevent the ribs from being accommodated within the grooves. The valve constituted using the float 11G can be used to the same effect as the valves of the first to ninth embodiments. When the float 11G reverts to its normal state, the grooves 15f prevent the float sticking to the side wall 4, 4A or 4B of the housing, allowing the float to revert to its normal state more quickly. When the junction F is divided into a plurality of sections, it is preferable for the grooves to extend axially along the float, but not essential.

In the case of the fifth embodiment shown in FIGS. 10 and 11 and the sixth embodiment shown in FIGS. 12 and 13, the housing 1 can be changed to housing 1A without changing the effect provided by the invention. In the case of the seventh and eighth embodiments shown in FIGS. 14 to 16, the same effect can be obtained even if the float 11E having the junction (pivot support portion) F between the cylindrical surface 15c and the conical surface 15d is changed to the float 11D of FIG. 12 having the junction F located at a point on the side face of the float intersected by a plane Q that is parallel to, and on the lower side of, a plane H that passes through the center of gravity G of the float and is orthogonal to axis X of the float. In the ninth embodiment shown in FIGS. 17 and 18, the same effect is provided even if the position of the ridge 15e is changed to that of the junction F shown in FIG. 12. Also, while in the ninth embodiment the pivot support portion is formed as a ridge 15e around the peripheral surface, the ridge 15e can instead be formed as a non-continuous plurality of sections around the peripheral surface, in which case it is preferable for the spaces between the ridge 15e sections to be smaller than the width of the guide ribs 4c and 8b, so that the ribs cannot enter the spaces.

As described in the foregoing, in accordance with the present invention, a configuration is used in which the gap between the inner surface of the housing and the outer surface of the float is larger away from the passage than it is near the passage, which is provided as a float guide means. Therefore, when the valve is turned on its side, the guide means guides the float toward the passage. At the point at which the float abuts against the lower part of the angled surface forming the valve seat, or against the ceiling, since the distance between the center axis of the passage and the center axis of the valve head is smaller than in the prior art configuration, there is less frictional resistance between the float and the angled surface of the valve seat or the ceiling.

Therefore, although the float is urged with the same spring force, the result is that the front of the float is lifted with a larger force than the force used to lift the float in the case of a prior art valve arrangement. Thus, the float is able to quickly close the passage, shutting off any leakage of gasoline.

The invention also includes a configuration in which the float is provided with a pivot support portion about which the float can pivot. In this case, under a spring force, the float is rotated as it is urged forward to abut the valve head against the valve seat, to thereby rapidly close the passage and stop leakage of gasoline. In accordance with another aspect, a plurality of grooves is provided around the outer surface of the float, with each groove extending axially with respect to the float. When the float reverts to its normal state, this arrangement prevents the float sticking to the side wall.

What is claimed is:

1. A valve comprising a housing having an outside-communicating passage and a float provided in the housing that opens and closes the passage by moving axially along the housing;
    the valve being provided with a float guide means that guides the float to close the passage by means of a gap formed between an inner surface of the housing and an outer surface of the float that increases in size with increasing distance from the passage, the guide means comprising a float tapered portion formed on the outer surface of the float that tapers in a direction away from the passage, the float tapered portion at a passage end being located from an outer peripheral edge of the float at the passage end to a point on the outer surface of the float that is intersected by a plane orthogonal to a float axis that passes through a center of gravity of the float.

2. A valve according to claim 1, which comprises a pivot support portion located at a point on a float side surface that is intersected by the plane orthogonal to the float axis that passes through the center of gravity of the float.

3. A valve according to claim 2, wherein the pivot support portion is formed by a junction between a float cylindrical surface and the float tapered portion, or by a junction between a first tapered portion and a second tapered portion constituting the float tapered portion.

4. A valve according to claim 3, wherein the pivot support portion is provided around an entire peripheral side surface of the float.

5. A valve according to claim 4, wherein the pivot support portion is divided into a plurality of sections by a plurality of grooves provided on the entire peripheral side surface of the float.

6. A valve according to claim 4, wherein the pivot support portion is divided into a plurality of sections by a plurality of grooves provided on the entire peripheral side surface of the float, the grooves being oriented axially with respect to the float.

7. A valve according to claim 3, wherein the pivot support portion is provided at a plurality of locations around an entire peripheral side surface of the float.

8. A valve according to claim 2, wherein the pivot support portion is provided around an entire peripheral side surface of the float.

9. A valve according to claim 8, wherein the pivot support portion is divided into a plurality of sections by a plurality of grooves provided on the entire peripheral side surface of the float.

10. A valve according to claim 8, wherein the pivot support portion is divided into a plurality of sections by a plurality of grooves provided on the entire peripheral side surface of the float, the grooves being oriented axially with respect to the float.

11. A valve according to claim 2, wherein the pivot support portion is provided at a plurality of locations around an entire peripheral side surface of the float.

12. A valve comprising a housing having an outside-communicating passage and a float provided in the housing that opens and closes the passage by moving axially along the housing;
    the valve being provided with a float guide means that guides the float to close the passage by means of a gap formed between an inner surface of the housing and an outer surface of the float that increases in size with increasing distance from the passage,
    the guide means comprising a plurality of guide ribs provided on the inner surface of the housing that taper in a direction toward the passage end.

13. A valve according to claim 12, which comprises a pivot support portion located at a point on a float side surface that is intersected by an plane orthogonal to a float axis that passes through a center of gravity of the float.

14. A valve comprising a housing having an outside-communicating passage and a float provided in the housing that opens and closes the passage by moving axially along the housing;
    the valve being provided with a float guide that guides the float to close the passage by a gap formed between an inner surface of the housing and an outer surface of the float that increases in size with increasing distance from the passage, the guide comprising a float tapered portion formed on the outer surface of the float that tapers in a direction away from the passage, the float tapered portion at a passage end being located from an outer peripheral edge of the float at the passage end to a point on the outer surface of the float that is intersected by a plane orthogonal to a float axis that passes through a center of gravity of the float.

15. A valve according to claim 14, which comprises a pivot support portion located at a point on a float side surface that is intersected by the plane orthogonal to the float axis that passes through the center of gravity of the float.

16. A valve according to claim 15, wherein the pivot support portion is formed by a junction between a float cylindrical surface and the float tapered portion, or by a junction between a first tapered portion and a second tapered portion constituting the float tapered portion.

17. A valve according to claim 16, wherein the pivot support portion is provided around an entire peripheral side surface of the float.

18. A valve according to claim 17, wherein the pivot support portion is divided into a plurality of sections by a plurality of grooves provided on the entire peripheral side surface of the float.

19. A valve according to claim 17, wherein the pivot support portion is divided into a plurality of sections by a plurality of grooves provided on the entire peripheral side surface of the float, the grooves being oriented axially with respect to the float.

20. A valve according to claim 16, wherein the pivot support portion is provided at a plurality of locations around an entire peripheral side surface of the float.

21. A valve according to claim 15, wherein the pivot support portion is provided around an entire peripheral side surface of the float.

22. A valve according to claim 21, wherein the pivot support portion is divided into a plurality of sections by a plurality of grooves provided on the entire peripheral side surface of the float.

23. A valve according to claim 21, wherein the pivot support portion is divided into a plurality of sections by a plurality of grooves provided on the entire peripheral side surface of the float, the grooves being oriented axially with respect to the float.

24. A valve according to claim 15, wherein the pivot support portion is provided at a plurality of locations around an entire peripheral side surface of the float.

25. A valve comprising a housing having an outside-communicating passage and a float provided in the housing that opens and closes the passage by moving axially along the housing;

the valve being provided with a float guide that guides the float to close the passage by a gap formed between an inner surface of the housing and an outer surface of the float that increases in size with increasing distance from the passage, the guide comprising a plurality of guide ribs provided on the inner surface of the housing that taper in a direction toward the passage end.

26. A valve according to claim 25, which comprises a pivot support portion located at a point on a float side surface that is intersected by an plane orthogonal to a float axis that passes through a center of gravity of the float.

* * * * *